United States Patent [19]

Kehl

[11] 4,222,199

[45] Sep. 16, 1980

[54] HYDROPONICS GROWING CONDUIT

[75] Inventor: Donald K. Kehl, Panama City, Fla.

[73] Assignee: Eugene A. Crist, Panama City, Fla.

[21] Appl. No.: 923,051

[22] Filed: Jul. 10, 1978

[51] Int. Cl.² ............................................ A01G 31/00
[52] U.S. Cl. ......................................................... 47/59
[58] Field of Search .................. 47/59, 60, 61, 62, 63, 47/64, 65; 193/32; 239/193; 405/32, 36, 38, 39

[56] References Cited

U.S. PATENT DOCUMENTS

| | | | |
|---|---|---|---|
| 3,543,437 | 12/1970 | Gaines | 47/59 |
| 3,667,157 | 6/1972 | Longhini | 47/59 |
| 4,035,950 | 7/1977 | Anselm | 47/59 |
| 4,079,547 | 3/1978 | Walker | 47/62 |
| 4,118,891 | 10/1978 | Kehl et al. | 47/62 |

OTHER PUBLICATIONS

Schippers, P. A., (1977), *Construction and Operation of the Nutrient Flow Technique for Growing Plants*, Long Island Horticultural Research Laboratory, Riverhead, N.Y. 11901, pp. 1–16.
Anon., (1976), (Advertizing Pamphlet), *Introducing the All New and Revolutionary Hygro-flow System*, 3935, N. Palo Alto, Panama City, Florida 32401, pub. by "Hygroponics Inc." at the address presented.
Schippers, P. A., (1977), *Annotated Bibliography on Nutrient Film Technique*, Dept. of Veg. Crops, N.Y. State College of Ag., Cornell Univ., Ithaca, N.Y. 14853, pp. 1–18, v.c. mimeo 186.
Schippers, P. A., (1977), *Annotated Bibliography on Nutrient Film Technique*, Update No. 1, Dept. of Veg. Crops, N.Y. State College of Ag., Cornell Univ., Ithaca, N.Y. 14853, pp. 1–6, v.c. mimeo 188.
Cooper, A. J., "Recent Experiences of Growers Using the Nutrient-film Technique", (publisher, date unknown).
Douglas, S. J., (1976), "Hydroponic Layflats", *World Crops*, (Mar./Apr.), pp. 82–87.
Larsen, J. E., (12/1976), *Texas Greenhouse Growers Newsletter*, vol. 13, No. 2, (2 pages) Texas Greenhouse Growers Council, P.O. Drawer –Aggieland Station, College Station, Tex. 77844
Cooper, A. J., "Carnation Production in Nutrient Film", (publication, publisher and date unknown).
Schippers, P. A., "Soiless Culture Update: Nutrient Flow Technique", (publication, publisher, date unknown).
Cooper, A. J., (1976), IWOSC Proceedings, 1976, (title, publisher unknown).

*Primary Examiner*—Edgar S. Burr
*Assistant Examiner*—James R. Feyrer
*Attorney, Agent, or Firm*—Peter L. Berger

[57] ABSTRACT

A combination of a rigid trough formed of a bottom and raised sides and a conduit which carries the water-nutrient solution to plants contained therein, the conduit being contained within the trough and being placed in the trough sufficiently spaced between the sides thereof to permit access to the underside of the conduit. A Dike Stick is so sized to fit under the conduit in one situation to provide a partial damming effect and to fit on top of the conduit by bridging the sides of the trough.

5 Claims, 4 Drawing Figures

U.S. Patent     Sep. 16, 1980     4,222,199
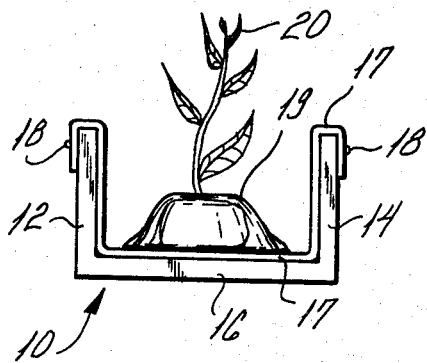
FIG. 1
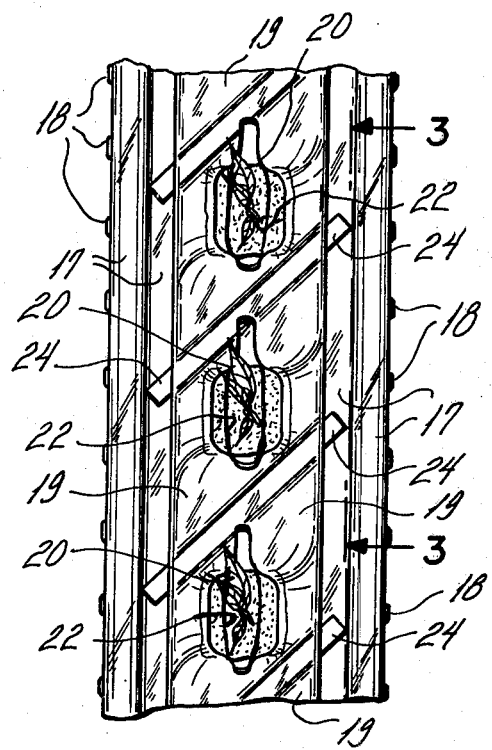
FIG. 2
FIG. 3
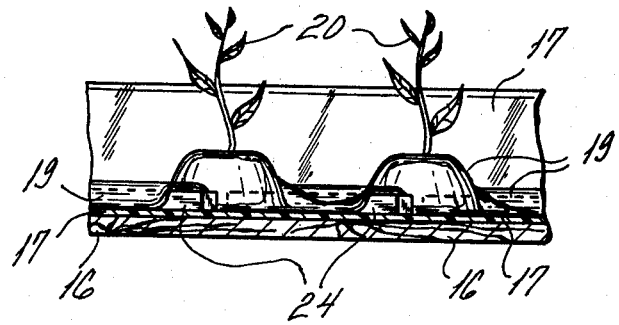
FIG. 4
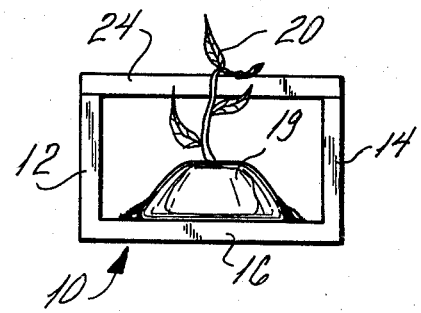

HYDROPONICS GROWING CONDUIT

BACKGROUND OF THE INVENTION

This invention relates to soilless growth of plants and vegetables, more particularly known as hydroponics.

STATEMENT OF PRIOR ART

Soilless growth of plants and vegetables is an old art. Generally, roots are grown in soilless media, and one common example is the provision of a fixed trough which serves as a conduit and carries a water-nutrient solution directly to plants contained therein. An example of a fixed trough system is illustrated in U.S. Pat. No. 3,667,157 issued to Fernando Longhini entitled "Apparatus for the Hydroponic Cultivation of Vegetables".

A variation on the rigid trough-like member in Longhini has been used by several parties, and this comprises the provision of a fixed trough constructed of such materials as plywood or the like, which is lined with a plastic type material. An example of this construction is illustrated in the publication entitled "Construction and Operation of the Nutrient Flow Technique for Growing Plants" by Dr. P. A. Schippers dated March 1977. That publication specifically describes such a channel system on page 4, which is illustrated in FIG. 2.

The inventor of the present application was a co-inventor in pending application Ser. No. 727,577, now U.S. Pat. No. 4,118,891, entitled "System for Growing Plants", which has been indicated as in condition for allowance and for which a Notice of Allowance has been issued. Submitted herewith is a promotional item of literature identifying the Hygro-Flo system covered by said patent application Ser. No. 727,577, the promotional literature being published in 1976. As illustrated therein, the fixed trough has been replaced by a flexible tube having openings therein for insertion of the plant which will be grown in the tube. The tube is placed on platforms which have a slope so that a water-nutrient solution flows through the tube to feed the plants contained therein. As additionally disclosed in said patent application Ser. No. 727,577, although not identified in literature submitted with this application, prior sales of a Dike Stick arrangement have been made, the Dike Stick being a tube placeable underneath the underside of the Hygro-Flo tube to present a partial damming effect to the water-nutrient solution, while being removed therefrom to be placed upon special side blocks to form a bridge on top of which the growing vegetables may be strung. This is more particularly seen in FIGS. 6 and 7 of said patent application, the Figures representing actual prior art sales of the devices illustrated therein.

The present invention represents a departure from all the above-identified prior art in that a specific trough is provided in which the conduit is placed. The trough is formed of a bottom and side portions, and the conduit in which growing plants are placed and grown is laid within the trough. Sufficient space exists between the sides of the trough and the conduit to permit access to the underside of the conduit.

The present invention represents an improvement over the prior art, in that the above-identified Dike Stick system may be more efficiently realized by placing the Dike Stick diagonally under the conduit, yet providing the Dike Stick with a size sufficient to be placed upon the sides of the trough to form the bridging system. The length of the Dike Stick is sufficient to accomplish both functions. Further, provision of the trough in which the conduit is placed allows for cleaning and sterilization of the conduit without attendant runoff. By referring to the promotional materials, it can be seen that the Hygro-Flo tube is placed on flat platforms. In some instances, the tube is used repeatedly, so that it is necessary to clean and flush the tube prior to its being reused, after the mature plants have been removed from the tube. In the prior system, such a cleaning and flushing arrangement could not be accomplished without attendant runoff and spillage on the sides of the platform. Additionally, sometimes the nutrient-water solution would overrun, so that spillage on the platforms and floor would occur. The present invention enables the flexible conduit to be reused and to accommodate its cleaning and sterilization in addition to handling spill-over without the attendant mess. The flexible tubes may now be used as many times as desired, without there being fixed installations, which is found in the conventional Longhini type of system identified above.

The present invention is also different from the plastic lined troughs identified, for example in the Schippers' disclosure, in that there is ample room to utilize the Dike Stick. The entire teaching of the Schippers' system is to construct an inexpensive trough of fluid impervious material, such as plastic by first building a plywood type structure and then covering it with the plastic type materials identified in his disclosure. This is materially different from a trough in which the conduit is contained, with the trough serving to carry spill over and cleaning liquids which are flushed through the conduit in which the plants are intended to be grown. The Schippers' system requires that the entire plastic lining be ripped from the plywood fixed construction, which is materially different from the instant invention, in which an undesirable plastic conduit can be easily removed by merely rolling it up and removing it from the trough.

Other documents have been considered herewith as prior art. These are set forth in the list of prior art references found in application Ser. No. 727,577. Among those further illustrative of the type of prior systems identified above as prior art are the following (copies submitted herewith).

Annotated Bibliography On Nutrient Film Technique by P.A. Schippers, January 1977

Annotated Bibliography On Nutrient Film Technique (Update No. 1) by Dr. P. A. Schippers, May 1977

Recent Experiences of Growers Using the Nutrient-Film Technique, by Dr. A. J. Cooper Hydroponic layflats, by J. Sholto Douglas, April 1976

Texas Greenhouse Growers Council Newsletter, Vol. 13, No. 2, December 1976

Carnation Production in Nutrient Film by Dr. A. J. Cooper

Soilless Culture Update: Nutrient Flow Technique by P. A. Schippers

Crop Production With Nutrient-Film Technique, by A. J. Cooper, United Kingdom, IWOSC Proceedings 1976

SUMMARY OF THE INVENTION

An object of the present invention is to provide an improved system for growing plants and vegetables without soil, as specifically set forth in the discussion above with regard to the prior art teachings.

Other objects, advantages and features of this invention will become more apparent from the following description.

BRIEF DESCRIPTION OF THE DRAWINGS

FIG. 1 is an end view of the trough of this invention containing the conduit, which itself contains a plant growing therein.

FIG. 2 is a top plan view of the trough and conduit combination of FIG. 1 with the Dike Stick placed underneath the conduit to present a partial damming effect.

FIG. 3 is a side partial view of the system of FIG. 2 showing the Dike Stick being placed on the bottom of the trough under the underside of the conduit to achieve a partial damming effect.

FIG. 4 is an end view similar to FIG. 1 in which the Dike Stick of FIGS. 2 and 3 has been removed from under the conduit and placed on top of the sides to form a bridge upon which vegetable parts, such as vines of tomatoes may be laid as the tomatoes are growing in the conduit. FIG. 4 shows an alternative embodiment for the trough construction.

DETAILED DESCRIPTION

Turning now to the drawings, in FIG. 1 there is shown a plastic-lined trough 10 having sides 12 and 14 and a bottom 16 with a plastic liner 17 stapled to the trough as at 18 to enable the plastic liner 17 to conform to the shape of the trough. A conduit 19 formed of a continuous plant tube constituted of a thin-pliant plastic foil is provided which contains plants 20. The plants may be placed in slots 22 located in the top side of the conduit 19.

A water-nutrient solution flows through the conduit due to the gravity effect on the slight slope provided for trough 10. When the plants are at the early stages of their growth, it may be desirable to partially dam the flow of the solution through the conduit in order to enhance early growth. This is achieved in the instant invention by the provision of an elongated member 24 being placed on the bottom 16 of the trough under the underside of the conduit 19, the elongated member 24 being of such height as to partially dam the flow of the solution through the conduit. As may be noted in FIG. 2, the elongated member is diagonally placed across the trough and is so sized so that it may also serve as a bridge member as seen in FIG. 4.

The elongated member 24 may be taken from under the conduit 19, at the appropriate time, and may be placed on top of the sides 12 and 14 of the trough. When placed on top of the sides of the trough, the elongated member 24 serves as a bridge upon which the vines or similar type portions of plants may be placed to allow the plant to achieve full growth while in the conduit.

It may be seen that in cases when the conduit is desired to be reused, it may be flushed and cleaned by passing suitable cleansing solution therethrough, with the cleansing solution being contained within the trough 10. The same liquid containing action of the plastic-lined trough occurs if there is inadvertent spillover from the conduit.

It is also noted that the conduit is placed in the trough and is sufficiently spaced between the sides of the trough to permit access to the underside of the tube in order to facilitate manipulation of the tube for purposes of cleaning or for purposes of utilization with the Dike Stick as described in this application.

In FIG. 4, the trough is made of a fluid impervious material such as fiber glass, so that plastic liner 17 is not required.

The trough may also be formed of a hard plastic. The fiber glass or hard plastic may be preformed to the shape of the trough.

What is claimed is:

1. In combination, a rigid trough formed of a bottom and fixed raised sides attached to said bottom, said raised sides having substantially uniform height for the length of said trough, and a conduit placed lengthwise in said trough, said trough being substantially coextensive with said conduit, said conduit comprising a continuous plant tube constituted of a thin, pliant plastic foil for containing plant root systems therein to receive a water-nutrient solution carried in said conduit, means selectively operable to partially dam the flow of said solution or to form a bridge over said conduit to support vegetation, said means consisting of an elongated member longer than the width of said trough and being of such height as to form a partial dam to partially dam the flow of said solution when placed on the bottom of and across said trough at an angle other than perpendicular to said raised sides, said elongated member alternatively serving as a bridge when placed across the tops of said sides and substantially perpendicular to said sides.

2. The invention of claim 1, wherein said trough is formed of a fluid impervious material.

3. The invention of claim 2, wherein said fluid impervious material is a plastic material.

4. The invention of claim 2, wherein said trough is a preformed fiber glass material.

5. The invention of claim 1, wherein said trough comprises a plastic-lined trough with plastic sheeting attached to and conforming to the shape of said trough.

* * * * *